Jan. 21, 1947. E. FUCHS 2,414,733

DEVICE FOR LOCATING AND SETTING OUT HOLES IN WORKPIECES

Filed Aug. 8, 1944

INVENTOR
ERNST FUCHS.
BY Haseltine Lake & Co
ATTORNEYS

Patented Jan. 21, 1947

2,414,733

UNITED STATES PATENT OFFICE 2,414,733

DEVICE FOR LOCATING AND SETTING OUT HOLES IN WORKPIECES

Ernst Fuchs, Wembley Park, England

Application August 8, 1944, Serial No. 548,612
In Great Britain August 9, 1943

2 Claims. (Cl. 33—174)

This invention relates to a device for locating and setting out holes in a workpiece and has for its object to provide a device which will enable holes to be located and set out in a much simpler manner and with a greater degree of accuracy than by the means at present employed, such as toolmaker's buttons, location discs and the like.

According to the present invention a device for locating the centre of a hole for the purpose of facilitating the measurement of distances from said centre consists of a hemisphere bearing an indication of the centre of its base whereby when the curved surface of the hemisphere is brought into entire peripheral contact with the hole, the centre of the base of the hemisphere always lies on the normal to the centre of the plane of the hole.

The device is particularly adapted for use in setting out and locating holes in conjunction with a setting and locating microscope of the kind described in our British patent specification No. 559,851. For this purpose, the centre of the base of the hemisphere is preferably indicated by intersecting lines marked thereon.

In order that the invention may be clearly understood and readily carried into effect, the same will now be described more fully with reference to the accompanying drawing, in which.

Figure 1:
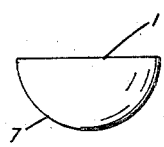
Figure 1 is a side elevation of the device.
Figure 2:
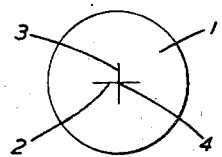
Figure 2 is a plan view of Figure 1.

Referring to the drawing the device consists of a hemishere, the base 1 whereof has marked thereon lines 2, 3, which intersect at the point 4 corresponding to the exact centre of the base 1.

Figure 3:
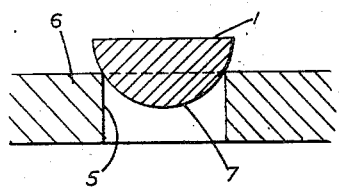
Figure 3 is a cross sectional view showing the device arranged in a hole in a workpiece.
Figure 4:
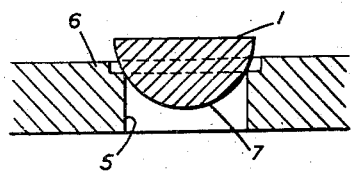
Figure 4 is a cross sectional view showing how the device may be used in locating the centre of a hole which has not been accurately finished.
Figure 5:
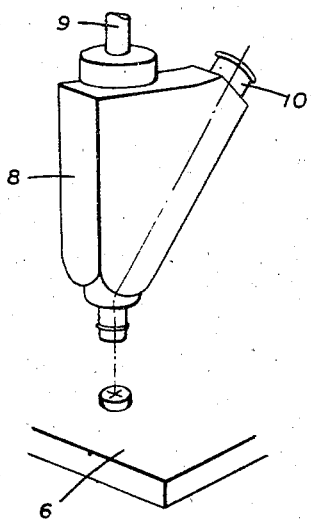
Figure 5 is a diagrammatic view showing the use of the device in conjunction with a setting and locating microscope.

In using the device to locate the centre of a hole in an existing workpiece for the purpose of enabling a further hole or holes to be drilled at a desired distance from the existing hole, the device is placed in the hole 5 in the workpiece 6 (see Figure 3) so that the curved surface 7 of the device is in entire peripheral contact with the hole 5. It will thus be seen that so long as the curved surface 7 is in entire peripheral contact with the hole, the centre of the base 1 of the device as indicated by the point of intersection 4 of the lines 2, 3, will always lie on the normal to the centre of the plane of the hole 5. In order, therefore, to locate the centre of the hole 5 with respect to the centre of the spindle of a drilling machine, a microscope 8 of the kind above referred to, as diagrammatically represented in Figure 5 is attached to the tool-holder of the drilling machine by means of the fixing shank 9. The workpiece is arranged under the microscope and the latter is adjusted until, when viewed in the eyepiece 10, the point 4 on the base 1 of the device is in coincidence with the cross wires or other reference means contained in the eyepiece 10. Having thus located the centre of the existing hole, the microscope is removed from the drilling machine spindle and a drill substituted therefor, whereupon by machine table feeding, a further hole or holes having their centres in exact alignment with the centre of the existing hole can be drilled in the workpiece at any desired distance from the centre of the hole. Should the hole 5 be burred or otherwise inaccurately finished at its upper periphery, it may be countersunk as shown in Figure 4 in order to provide an accurate seating for the device.

The device can be made in various sizes to suit holes of different dimensions.

While in the embodiment described above and illustrated in the drawing the centre of the base of the hemisphere is indicated by intersecting lines, it is to be understood that any other desired means which gives an indication of the centre of said base may be employed without departing from the scope of the invention.

I claim:

1. Device for use with an optical viewing device for locating the centre of a hole for the purpose of facilitating the measurement of distances from said centre consisting of a hemisphere having markings on its plane surface which indicate the centre of said surface whereby when the curved surface of said hemisphere is brought into entire peripheral contact with the hole, the centre of the plane surface of said hemisphere always lies on the normal to the centre of the plane of said hole.

2. Device for use with an optical viewing device for locating the centre of a hole for the purpose of facilitating the measurement of distances from said centre consisting of a hemisphere having marked on its plane surface intersecting lines which indicate the centre of said surface whereby when the curved surface of said hemisphere is brought into entire peripheral contact with the hole, the centre of the plane surface of said hemisphere always lies on the normal to the centre of the plane of said hole.

ERNST FUCHS.